US012001072B2

(12) United States Patent
Claessens et al.

(10) Patent No.: US 12,001,072 B2
(45) Date of Patent: Jun. 4, 2024

(54) TELECOMMUNICATIONS CABLE MANAGEMENT COMPONENT HOUSING

(71) Applicant: COMMSCOPE CONNECTIVITY BELGIUM BVBA, Kessel-Lo (BE)

(72) Inventors: Bart Mattie Claessens, Hasselt (BE); Roger Joseph Alaerts, Aarschot (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 330 days.

(21) Appl. No.: 17/277,519

(22) PCT Filed: Sep. 18, 2019

(86) PCT No.: PCT/EP2019/075058
§ 371 (c)(1),
(2) Date: Mar. 18, 2021

(87) PCT Pub. No.: WO2020/058355
PCT Pub. Date: Mar. 26, 2020

(65) Prior Publication Data
US 2021/0349273 A1 Nov. 11, 2021

Related U.S. Application Data

(60) Provisional application No. 62/732,636, filed on Sep. 18, 2018.

(51) Int. Cl.
*G02B 6/00* (2006.01)
*G02B 6/44* (2006.01)

(52) U.S. Cl.
CPC .................. *G02B 6/4446* (2013.01)

(58) Field of Classification Search
CPC ....... G02B 6/4446; G02B 6/00; H02G 15/113
See application file for complete search history.

(56) References Cited

U.S. PATENT DOCUMENTS

| 5,375,185 A | 12/1994 | Hermsen et al. |
| 5,378,174 A * | 1/1995 | Brownlie ................. H02G 3/16 |
| | | 439/721 |
| 5,577,151 A | 11/1996 | Hoffer |

(Continued)

FOREIGN PATENT DOCUMENTS

| DE | 10 2007 050 624 A1 | 4/2009 |
| EP | 2 450 727 B1 | 9/2013 |

OTHER PUBLICATIONS

International Search Report and Written Opinion of the International Searching Authority for International Patent Application No. PCT/EP2019/075058 dated Nov. 22, 2019, 13 pages.

*Primary Examiner* — Jennifer Doan
(74) *Attorney, Agent, or Firm* — Merchant & Gould P.C.

(57) ABSTRACT

Telecommunications cable management component housing assemblies that can be assembled without adhesive, and associated methods for assembling cable management component housings. The assembly includes a body and a lid that can be assembled together in a permanent or semi-permanent configuration. The body and the lid include complementary locking features. The lid is resiliently flexible to enable the lid to be assembled to the body. The body defines a cable management component housing volume that houses one or more cable management components, such as splitters, wave division multiplexors, and splices.

27 Claims, 10 Drawing Sheets

(56) References Cited

U.S. PATENT DOCUMENTS

| | | |
|---|---|---|
| 5,835,657 A | 11/1998 | Suarez et al. |
| 9,678,296 B2 * | 6/2017 | Krampotich ......... G02B 6/4452 |
| 2016/0161695 A1 * | 6/2016 | Chen ....................... F16B 5/126 |
| | | 385/136 |

* cited by examiner

TELECOMMUNICATIONS CABLE MANAGEMENT COMPONENT HOUSING

CROSS-REFERENCE TO RELATED APPLICATION

This application is a National Stage Application of PCT/EP2019/075058, filed on Sep. 18, 2019, which claims the benefit of U.S. Patent Application Ser. No. 62/732,636, filed on Sep. 18, 2018, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, and wave division multiplexors.

Fiber optic splitters are all known in the art, and are generally located in the proximity of fiber optic connectors and adapters to allow fiber optic cables to be selectively attached. Typical fiber optic splitters receive data signals via one or more fiber optic input lines. The splitters are often attached to a panel or a tray via a carrier or adapter. The panel or tray to which the splitter is attached usually includes, among other things, connection points, mounting points and routing elements for the fiber optic cable. The splitters divide each input data signal into a plurality of signals sent to a plurality of output ports of the respective splitter.

Typical splitters may include 1×2, 1×4, 1×8, 1×16 or higher dimension splitters. Telecommunications closures often are used to house such splitters. During use, it is desired that the splitters are protected and do not slide or move within the closure. Such movement within a closure can be damaging to the splitters, cables and/or the closures. An improved way of securing and protecting splitters within a closure is desired.

SUMMARY

In general terms, the present disclosure is directed to a housing for one or more telecommunications cable management components, where the housing comprises a housing assembly including a body and a cover that interlocks with the body without adhesive. By eliminating the need for adhesive in the component housing assembly, the assembly is simplified and streamlined (e.g., there is no need to wait for adhesive to cure) and the chances of damaging delicate telecommunications components with adhesive are reduced. One or more splitters, wave division multiplexors, splices or splice holders, or other cable management components are secured to an interior surface of the component housing. The housing can be mounted to a tray or panel positioned within the closure volume of a telecommunications closure. The housing can be a universal housing for holding any of a plurality of different cable management components.

According to certain aspects of the present disclosure, an assembly for an optical cable management component housing comprises: a body extending longitudinally from an open first end to an opposing open second end and defining a component housing volume between the open first and second ends, the body including a bottom wall, two parallel side walls extending from the bottom wall, and an open top extending between the two side walls between the first and second opposing ends, the bottom wall having a surface for mounting one or more optical components, such as splitters, wave division multiplexors or splices or splice holders, the two side walls defining a first set of locking features; and a cover, the cover defining a second set of locking features that are complementary to the first set of locking features and adapted to engage and interlock with the first set of locking features to cover the open top of the body.

In some examples the cover has an unflexed configuration and a flexed configuration and is adapted to resiliently flex to the flexed configuration to engage the second set of locking features with the first set of locking features. In some examples, the cover is adapted to return to an unflexed position to interlock the second locking features with the first locking features.

In some examples, each of the side walls includes opposing first longitudinal end sections and a first middle section positioned between the first longitudinal end sections, the first middle section being shorter than the first longitudinal end sections, and wherein transitions between the first longitudinal end sections and the first middle section of each wall define the first set of locking features.

In some examples, the first set of locking features includes two pairs of opposing notches. In some examples, each of the notches includes a surface that is angled acutely relative to a longitudinal axis of the body.

In some examples, the cover includes opposing second longitudinal end sections and a second middle section positioned between the second longitudinal end sections, wherein transitions between the second longitudinal end sections and the second middle section define the second set of locking features. In some examples, the second set of locking features includes two pairs of opposing teeth, the teeth having a structure that complements the notches. In some examples, each of the teeth includes a surface that is angled acutely relative to a longitudinal axis of the cover. In some examples, the second longitudinal end sections have a width that is smaller than a corresponding width of the second middle section. In some examples the first middle sections of the side walls define a third set of locking features. In some examples, the second middle section of the cover includes a fourth set of locking features. In some examples, the third and fourth sets of locking features are complementary and adapted to interlock with each other. In some examples the third set of locking features comprises a pair of tab retainers having a substantially round perimeter. In some examples, the fourth set of locking features comprises a pair of tabs, each of the tabs comprising a pair of tab members defining a slot therebetween, each of the tab members having a partially round perimeter. In some examples, the tab members are adapted to resiliently flex towards each other into the slot.

In some examples, the cover and the base are adapted to be permanently or semi-permanently interlockingly secured to each other without adhesive. In some examples, the cover and the base are adapted to be interlockingly secured such that an attempt to separate the cover and the base causes at least one of the components (e.g., the cover) to break.

According to further aspects of the present disclosure, a method of assembling a telecommunications cable management component housing comprises: providing a body and a cover of the component housing, the body extending longitudinally from an open first end to an opposing open second end and defining a component housing volume between the open first and second ends, the body including a bottom wall, two parallel side walls extending from the bottom wall, and an open top extending between the two side walls between the first and second opposing ends, the bottom wall having a surface for mounting one or more cable management components such as splitters, wave division multiplexors, splices or splice holders, the two side walls defining a first set of locking features, the cover defining a second set of locking features that are complementary to the first set of locking features and adapted to engage and interlock with the first set of locking features to cover the open top of the body; inserting at least one cable management component in the component housing volume; securing the at least one component to a surface of the body; flexing the cover from an unflexed configuration to a flexed configuration in which opposing longitudinal ends of the cover are closer together than in the unflexed configuration; engaging the first set of locking features with the second set of locking features; and pressing the cover such that the cover returns to the unflexed configuration.

In some examples, the method further comprises securing the body to a tray or a panel, such as a splitter tray or a splitter panel, wherein the tray or the panel is housed in a telecommunications closure.

In some examples, the side walls define a third set of locking features, and the cover includes a fourth set of locking features; and wherein the pressing causes the third set of locking features to interlock with the fourth set of locking features. In some examples, the third set of locking features includes a pair of tab retainers having a substantially round perimeter, and the fourth set of locking features comprises a pair of tabs, each of the tabs comprising a pair of tab members defining a slot therebetween, each of the tab members having a partially round perimeter. In some examples, the pressing causes the tab members of each tab to flex towards each other as the tabs engage the tab retainers. In some examples, once the cover returns to the unflexed position, the tab members resiliently spread apart from each other causing the tabs to be securely retained by the tab retainers.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1:
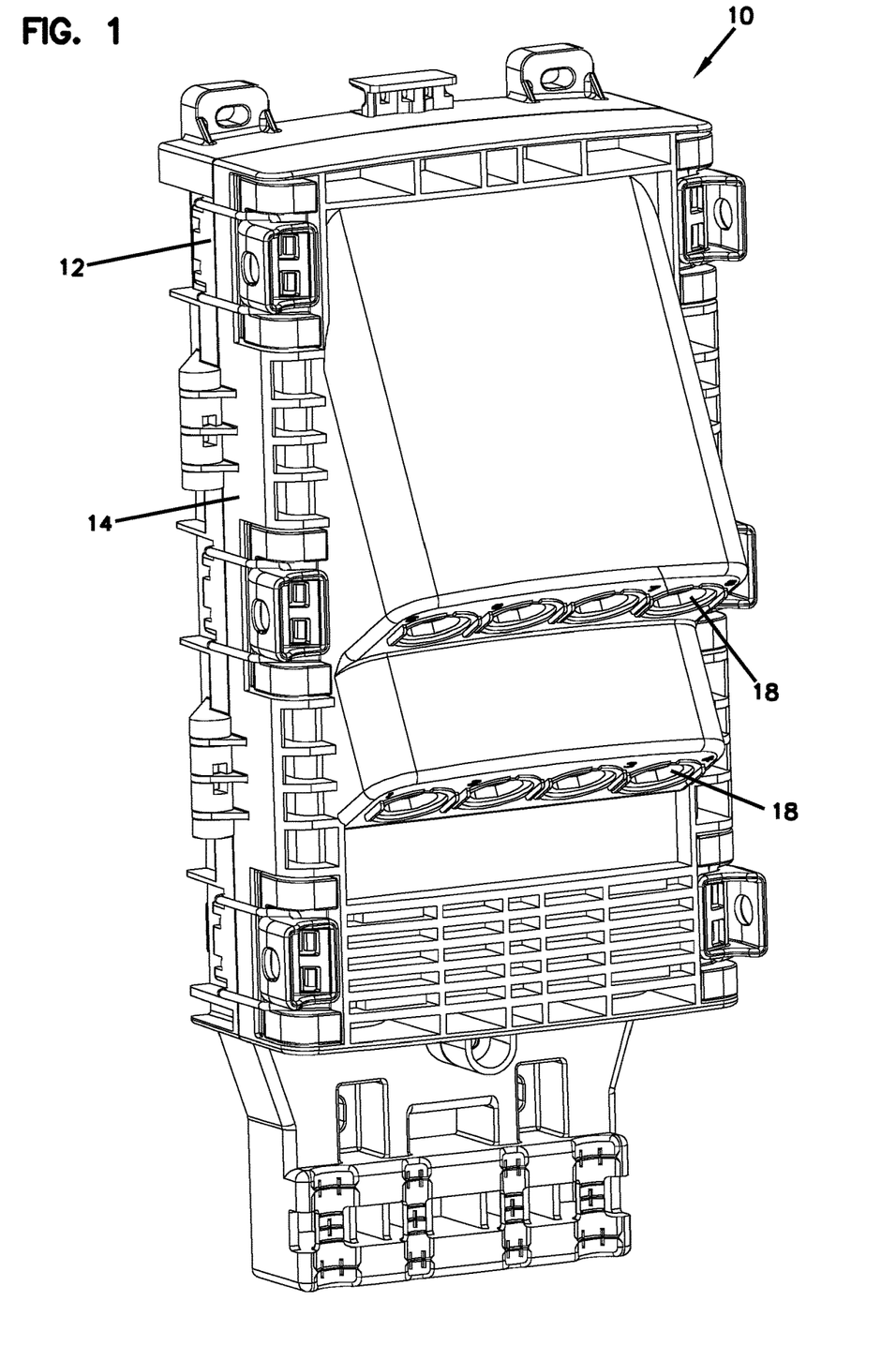
FIG. 1 is a perspective view of an example telecommunications closure adapted to house cable management component housings in accordance with the present disclosure, the closure being a in a closed configuration.
Figure 2:
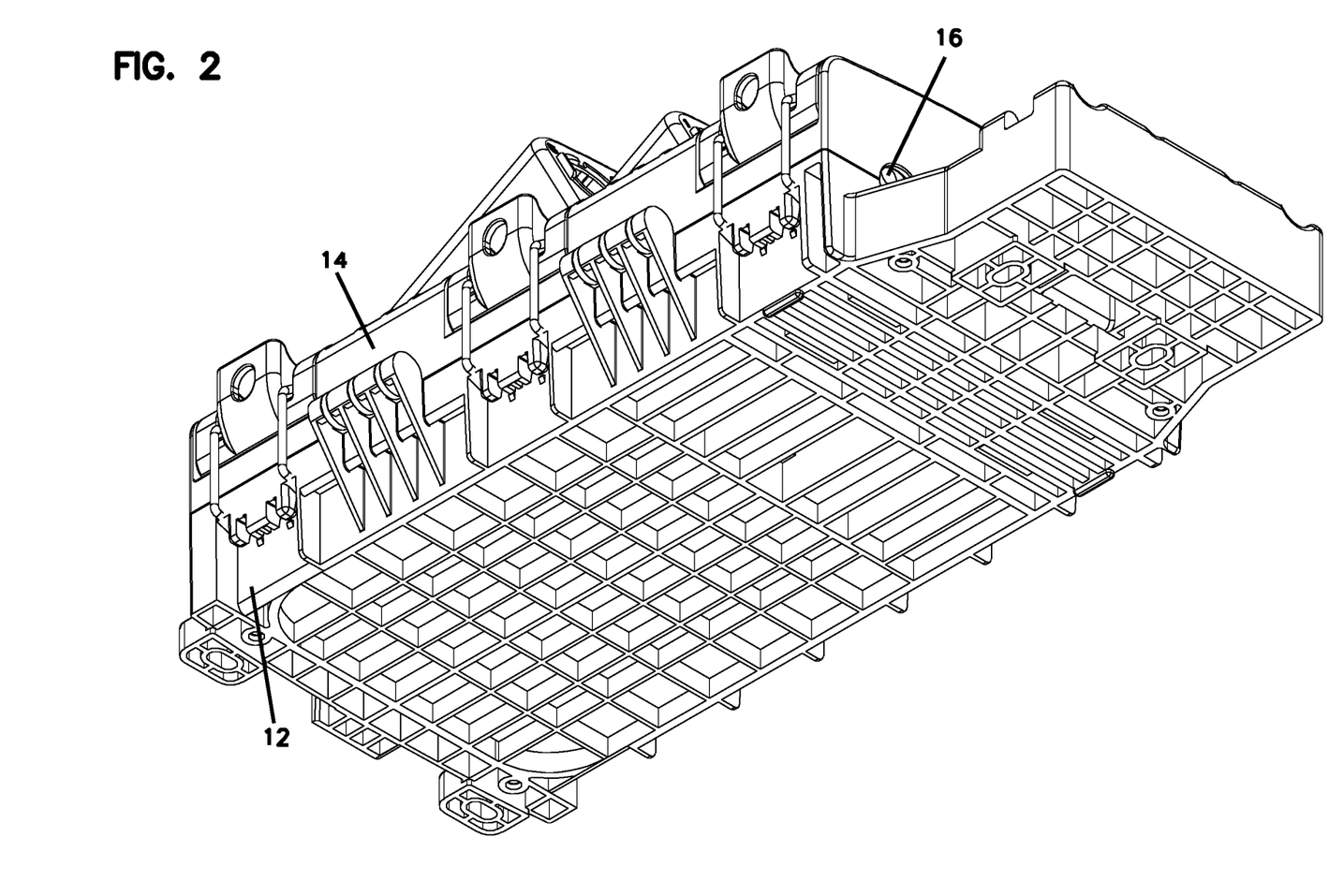
FIG. 2 is a further perspective view of the example telecommunications closure of FIG. 1 in a closed configuration.
Figure 3:
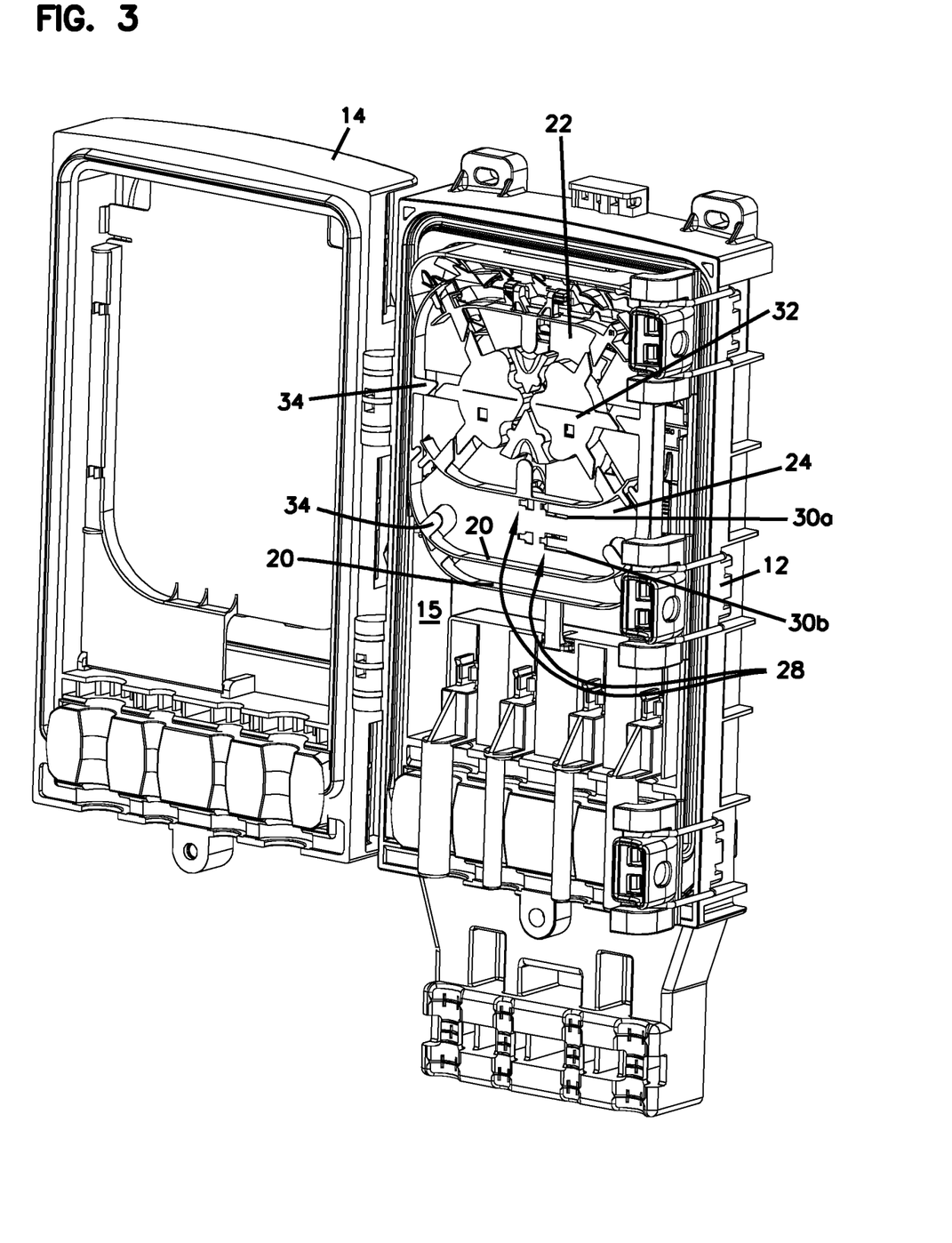
FIG. 3 is a further perspective view of the closure of FIG. 1, the closure being in an open configuration.

Referring to FIGS. 1-3, an example telecommunications closure 10 includes a base 12 and a cover 14 hingedly coupled to each other and adapted to selectively sealingly engage each other to define a closure volume 15. Optical cables carrying optical fibers enter the closure volume 15 via first ports 16. The optical cables are managed within the closure volume, and routed through second ports 18. In this manner optical signals can be routed as desired, e.g., from one or more main input cables to a plurality of distribution cables.

To manage the optical fibers within the closure volume 15, trays 20 are provided. The trays 20 can be stacked one atop another in pivotal fashion within the closure volume 15, such that each tray can be accessed by pivoting away the trays that are stacked above it. To provide this pivotability, the trays 20 include hinge pins adapted to pivotally mate with hinge sockets provided by another structure within the closure volume 15.

Each of the trays 20 includes an organizing area 22 and a cable management component area 24. The cable management component area 24 includes a major surface 26 defining a plurality of cable management component housing couplers 28. The cable management component couplers 28 complement structures on cable management component housings to securely couple the cable management component housings to the cable management component area 24. The example trays 20 include two mounting positions 30a and 30b, each including its own cable management component housing coupler 28. It should be appreciated that any suitable number of mounting positions 30 may be provided in the cable management component area 24.

The organizing area 22 includes organizing features such as a spool structure 32 and retaining tabs 34 for looping, holding, and routing lengths of cable to and/or from the cable management component area 24 and/or to and/or from an area of the closure volume 15 that is off the tray 20.

Figure 4A:
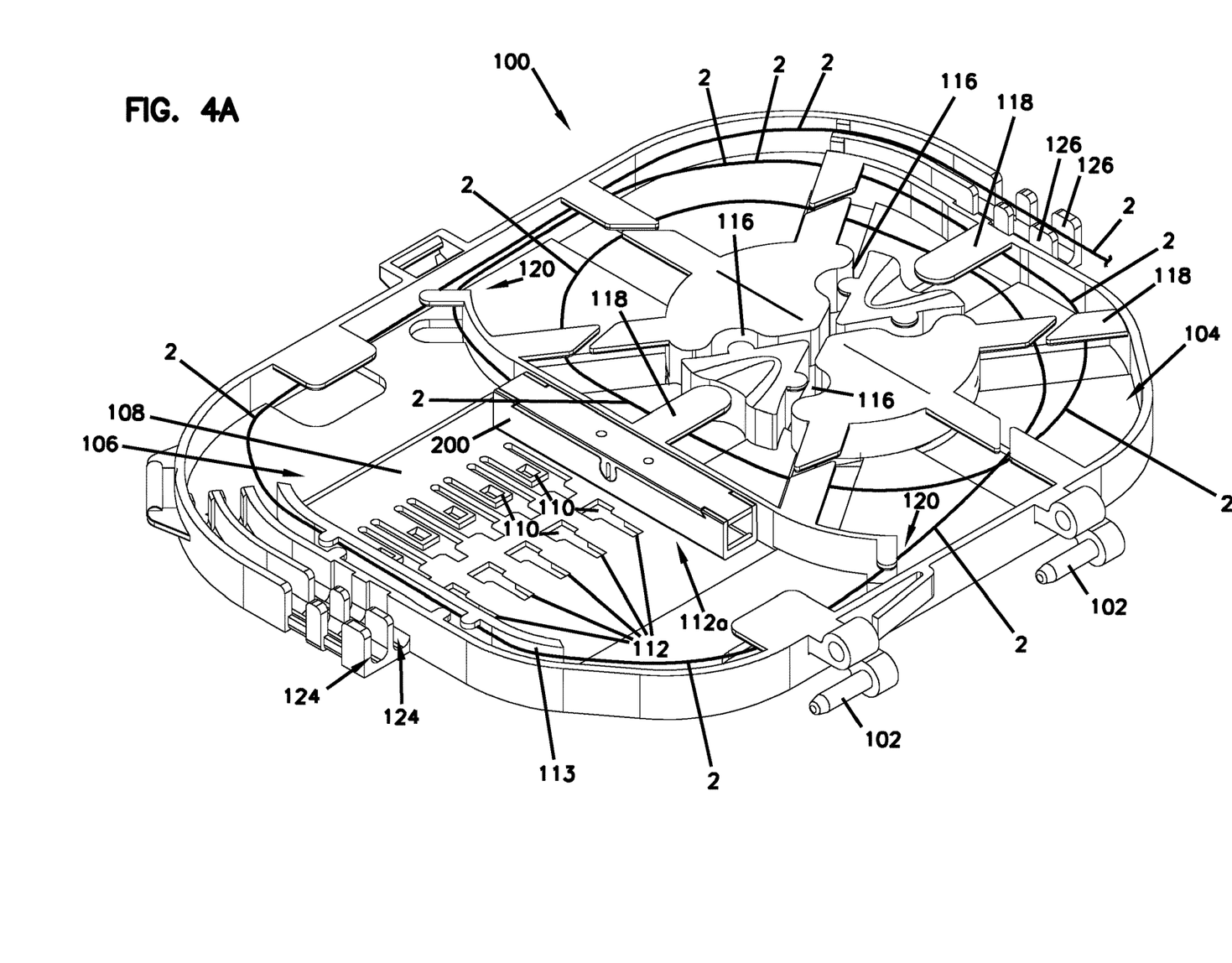
FIG. 4A is a perspective view of an optical cable management tray holding an example cable management component housing in accordance with the present disclosure, the housing being held at a first mounting position on the tray, and illustrating a pre-splitter cable routing scheme.
Figure 4B:
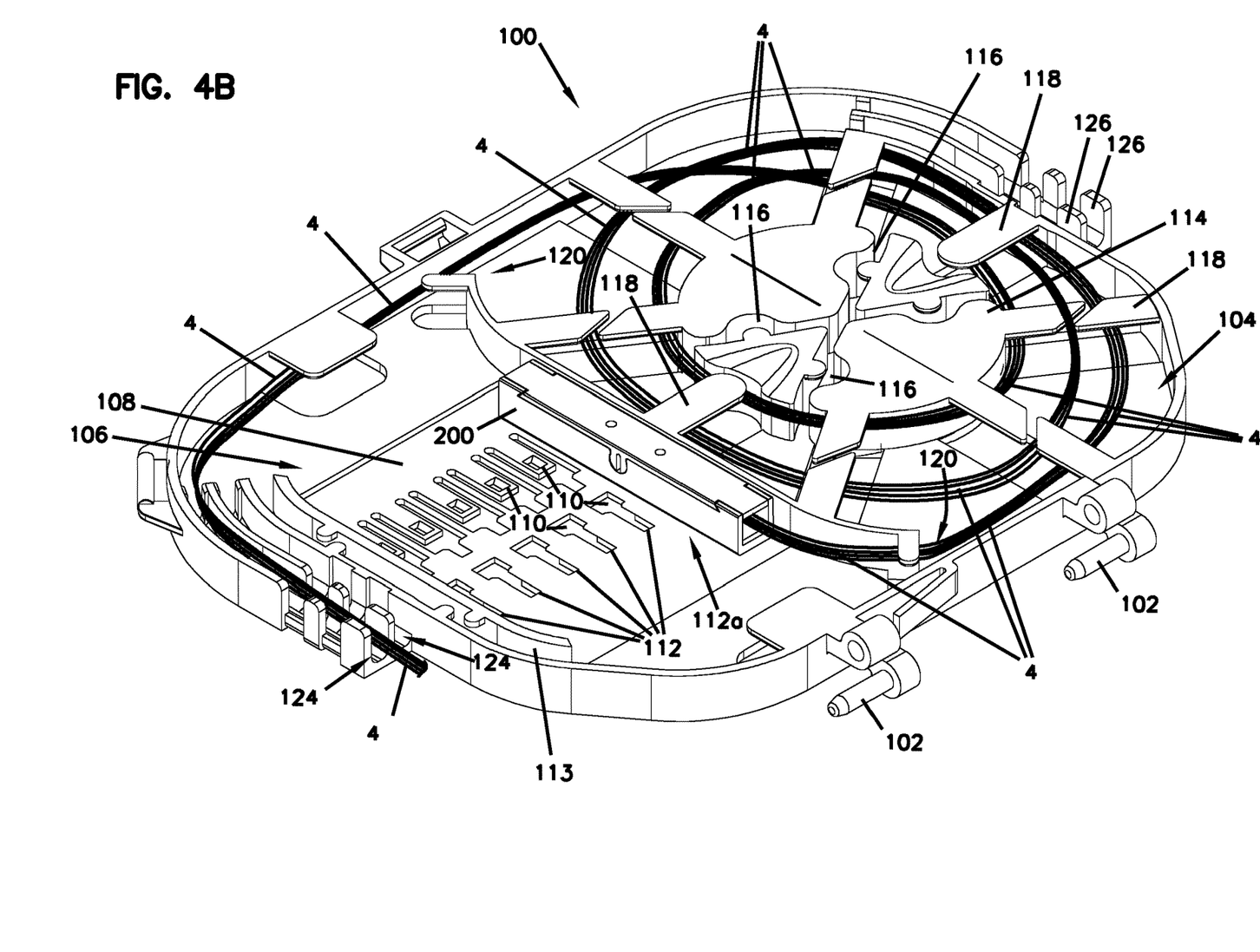
FIG. 4B is a perspective view of an optical cable management tray holding an example cable management component housing in accordance with the present disclosure, the housing being held at a first mounting position on the tray, and illustrating a post-splitter cable routing scheme.
Figure 5:
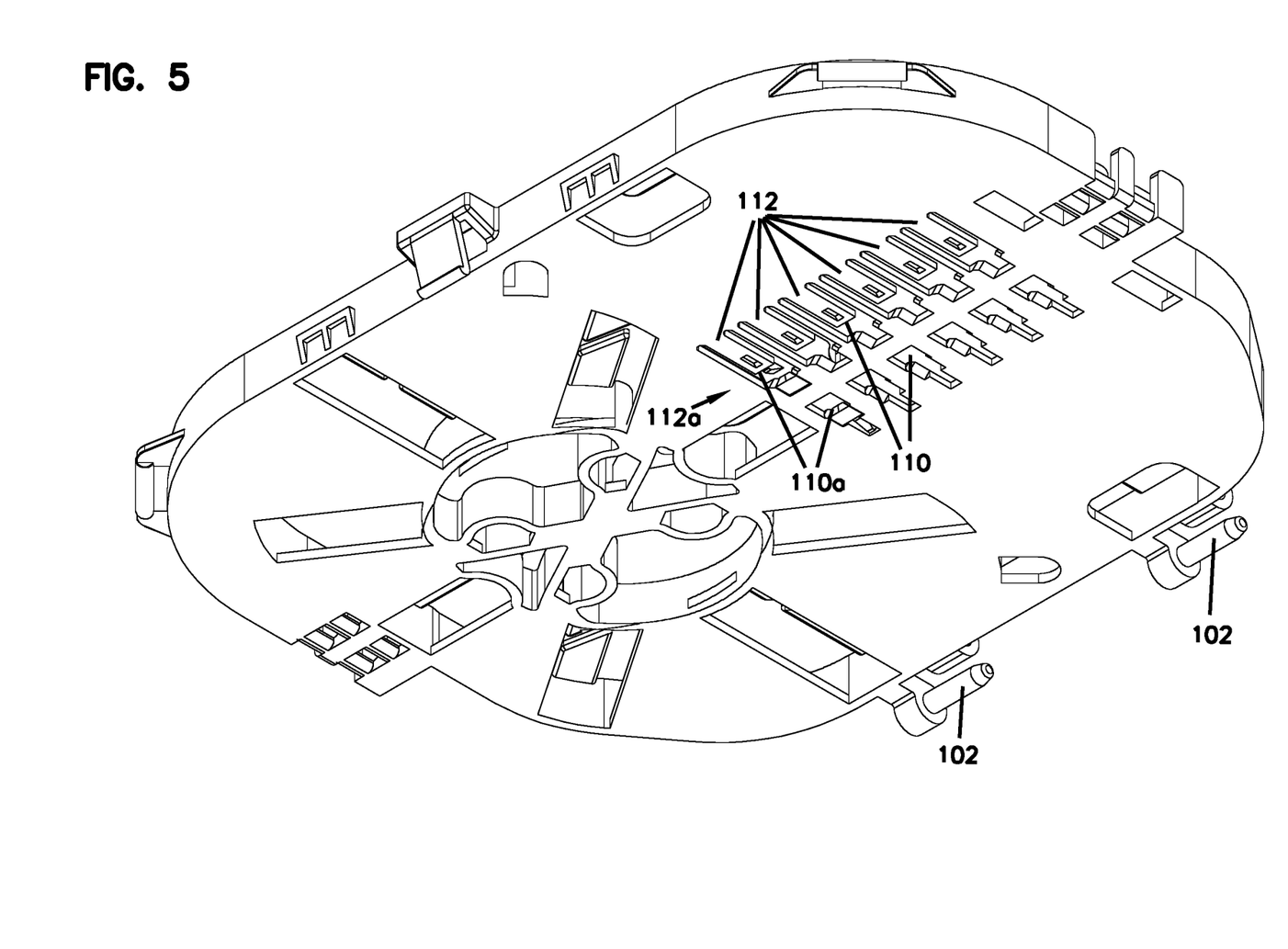
FIG. 5 is a further perspective view of the optical cable management tray of FIG. 4.
Figures 6, 7:
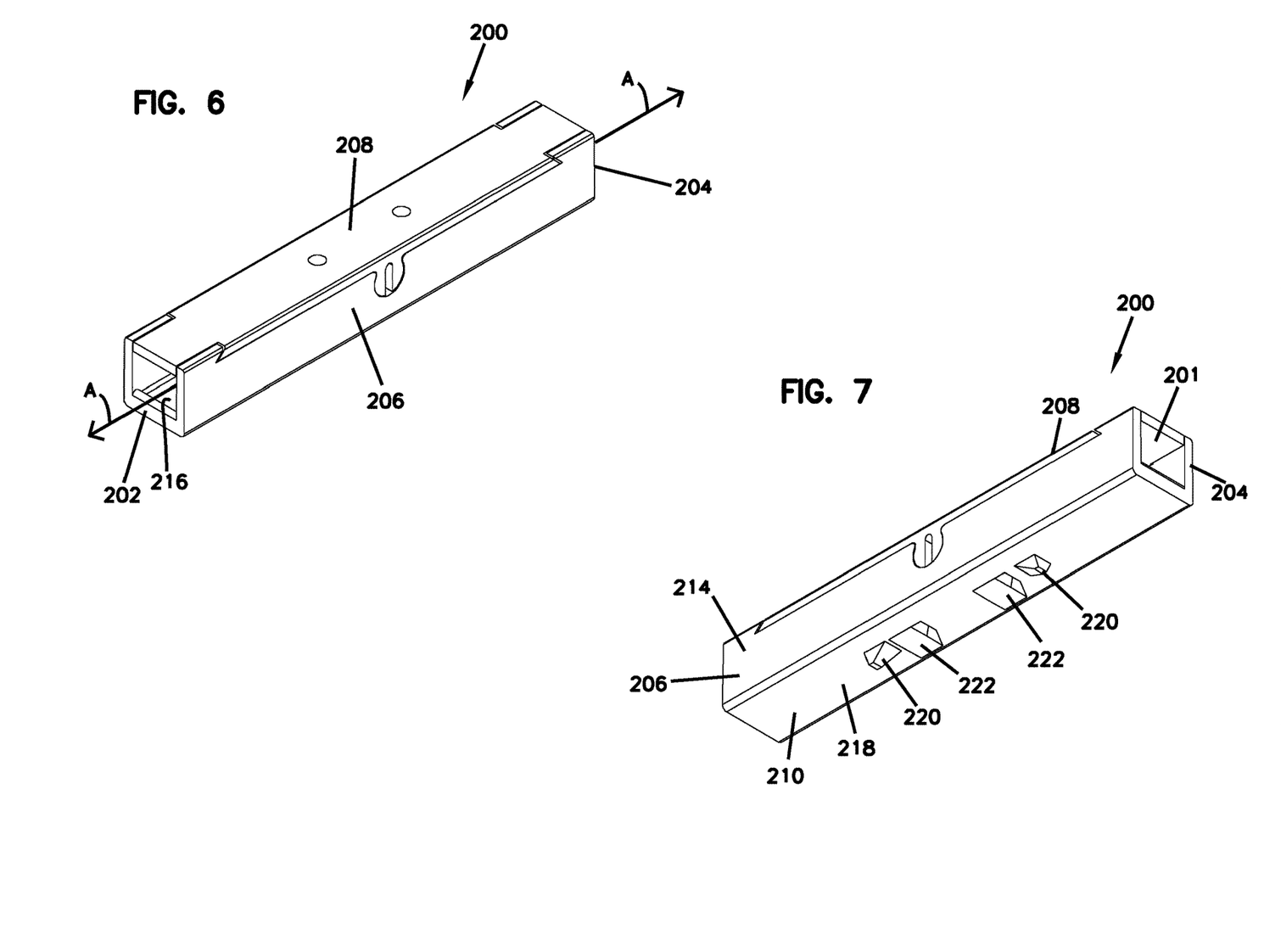
FIG. 6 is a perspective view of an assembled cable management component housing in accordance with the present disclosure.
FIG. 7 is a further perspective view of the assembled housing of FIG. 6.
Figure 8:
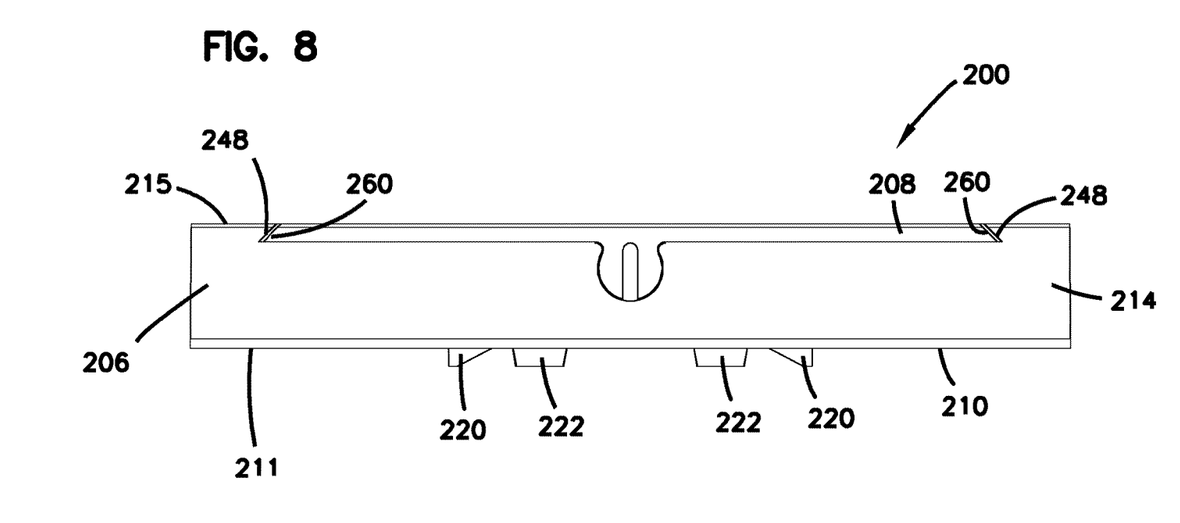
FIG. 8 is a side view of the assembled housing of FIG. 6.

Referring now to FIGS. 4A, 4B, and 5, the tray 100 can be substituted for the tray 20 described above. The tray 100 includes hinge pins 102 adapted to pivotally couple with hinge sockets. The tray 100 includes an organizing area 104 and a cable management component area 106. The cable management component area 106 includes a major surface 108 that defines a plurality of cable management component couplers 110. In this example, the cable management component area includes six mounting positions 112, each with its own cable management component housing coupler 110 for coupling a cable management component housing. In the example shown, one of the mounting positions 112a has a cable management component housing mounted thereon. In this example, the cable management component housing depicted is a splitter housing 200 mounted thereon, the splitter housing 200 being in accordance with the present disclosure. The splitter housing 200 is securely coupled to the splitter housing coupler 110a defined by the major surface 108 at the mounting position 112a.

The organizing area 104 includes a spool structure 114 that defines channels 116 that allow the routing direction of a cable to be changed, e.g., from counterclockwise to clockwise or vice versa, around the spool structure 114. Tabs 118 help to keep the loops of cable contained in the organizing area 104. Passageways 120 allow cables to be routed between the organizing area 104 and the cable management component area 106. Entry channels 124 provide access of cables between the cable management component area 106 and areas that are off the tray 100. Entry channels 126 provide access for cables between the organizing area 104 and areas off the tray 100. The organizing area 104 and the spool structure 114 are sized and shaped to protect the optical fibers of the cables from being bent beyond their minimum bend radii.

The cable management component area 106 includes a slack channel 113 for receiving cable slack as the cable is routed through different parts of the tray 100.

FIG. 4A depicts an example routing scheme of a cable 2 on the tray 100 until it enters the splitter housing 200. FIG. 4B depicts an example routing of the cables 4 that have been split by a splitter from the cable 2 in FIG. 4A and are shown exiting the splitter housing 200.

Referring to FIG. 4A, a cable 2 within the closure volume 15 (FIGS. 1-3) enters the tray 100 via an entry channel 126. The cable 2 is routed along a side wall of the tray 100 from the organizing area 104 to the cable management component area 106 via a passageway 120 and then through the slack channel 113 and back into the organizing area 104 where additional slack is spooled around the spool structure. The cable 2 is then routed back into the cable management component area 106 and into the splitter housing 200 containing a splitter.

Referring to FIG. 4B, the splitter splits the cable 2 into four cables 4 that leave the splitter housing 200 on the opposite end. The four cables 4 are routed back into the organizing area 104 via another passageway 120 and slack is spooled around the spooling structure 114. The four cables 4 are then routed back into the cable management component area 106 and off the tray via an entry channel 124.

It should be appreciated that the splitter housing 200 is adapted to hold one or more splitters. Each splitter includes an input port and a plurality (e.g., 4, 16) of output ports. Each splitter is adapted to divide an input data signal provided through the cable 2 entering the input port into a plurality of signals sent via the a plurality of cables 4 that pass through the plurality of output ports of the splitter. The splitters (or other cable management components) can be of different sizes. In some examples, the one or more splitters (or other cable management components) are secured, e.g., with glue or tape, to an interior surface of the housing 200. In some examples, the one or more splitters (or other cable management components) are frictionally held within the housing 200, i.e., without glue or tape.

Referring now to FIGS. 6-11, the splitter housing 200 extends along a longitudinal axis A between an open first end 202 and an opposing open second end 204. The splitter housing 200 includes a body 206 and a cover 208. The cover 208 is adapted to lockingly engage the body 206 in a secure manner without adhesive. The splitter housing 200 has a bottom 211 and a top 213.

Figure 9:
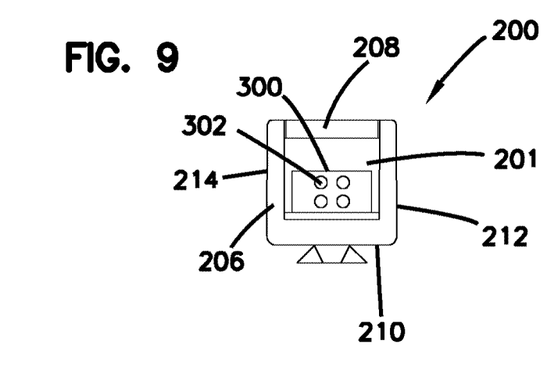
FIG. 9 is an end view of the assembled housing of FIG. 6.

The body 206 includes a bottom wall 210 and two side walls 212 and 214 that are parallel to each other and extend perpendicularly upward from the bottom wall 210. The top 217 of the body 206 is open. The bottom wall 210 includes a planar inner surface 216 and a planar outer surface 218. One or more splitters (or other cable management components), or containers containing splitters or cable management components, can be secured to the planar inner surface 216, e.g., with adhesive, after being inserted into the body 206 through the open top 217. In alternative examples, the side walls 212 and 214 include flexible latching arms that latch over one or more splitters or splitter containers (or other cable management components) to secure them within the housing volume 201 defined by the body 206. An example splitter 300 is schematically shown in FIG. 9 secured with adhesive to the planar inner surface 216. The splitter 300 is a 1×4 splitter with the four output ports 302 showing.

Protruding downward from the planar outer surface 218 are mounting features 220 and 222. The mounting features 220 and 222 are configured to interlock with the cable management component housing couplers 110 (FIG. 4) to secure the body 206 at one of the mounting locations 112 on the tray 100 (FIG. 4).

Lips 224, 226 at either end 202 and 204 extend upward from the planar inner surface 216. The lips 224, 226 can, e.g., act as a stop to prevent sliding of a cable management component out of the housing volume 201 while it is being secured therein. For example, a splitter or splitter container can be positioned such that an end of the splitter or splitter container abuts one of the lips 224, 226.

Each of the side walls 212, 214, includes opposing first longitudinal end sections 230, 232, and 234, 236, respectively, and a first middle section 238, 240, respectively, positioned between the first longitudinal end sections. The first middle section 238, 240 is shorter, relative to the bottom 211 of the body 206, than the corresponding first longitudinal end sections 230, 232, or 234, 236. Transitions between the first longitudinal end sections and the first middle section of each side wall 212, 214 define a first set of locking features. In this example, the first set of locking features is, for each side wall 212, 214, a pair of opposing notches 242, 244 partially defined by a surface 248 that is angled acutely relative to the longitudinal axis A.

The cover 208 includes opposing second longitudinal end sections 250, 252 and a second middle section 254 positioned between the second longitudinal end sections 250, 252. Transitions between the second longitudinal end sections 250, 252 and the second middle section 254 define a second set of locking features. In particular, the second set of locking features includes two pairs of opposing teeth 256, 258, the teeth having a structure that complements the notches 242, 244. In the depicted example, each of the teeth 256, 258 includes a surface 260 that is angled acutely relative to the longitudinal axis A and complementarily to a corresponding surface 248 of the body 206.

The second longitudinal end sections 250, 252 have a width w1 that is smaller than a corresponding width w2 of the second middle section 254. In some examples the width w2 is in a range from about ⅛ inch to about ½ inch. In some examples, the width w2 is approximately ¼ inch. In some examples, the axial length of the body 206 from the end 202 to the end 204 is in a range from about 1 inch to about 4 inches. In some examples the axial length is approximately 2 inches.

The first middle sections 238, 240 of the side walls 212, 214 also define a third set of locking features and the second middle section 254 of the cover 208 includes a fourth set of locking features that are complementary to, and adapted to interlock with, the third set of locking features.

In particular, the third set of locking features includes a pair of tab retainers 270 defining cutouts having a substantially round perimeter and an open top 272. From their open tops 272, the tab retainers 270 first increase in width (parallel to the axis A) and then decrease in width (parallel to the axis A) towards the bottoms 274 of the tab retainers 270. Centers of the tab retainers 270 (relative to the axis A) are longitudinally equidistant from the open first and second ends 202 and 204.

The fourth set of locking features includes a pair of opposing tabs 280 extending downward from a bottom surface 209 of the cover 208 on opposite sides of the cover 208. Centers of the tabs 280 (relative to the axis A) are longitudinally equidistant from opposing ends 211, 213 of the cover 208. Each of the tabs 280 includes a pair of tab members 282 defining a slot 284 therebetween. A portion of the perimeter of each tab member 282 is round or substantially round and is adapted to structurally complement the perimeter of the tab retainers 270. The tab members 282 are adapted to resiliently flex towards each other (i.e., in the directions of the arrows 290) into the slot 284, which occurs when the tab members 282 are pressed downwards into the tab retainers 270 causing a relatively wide portion of the tabs 280 to contact, and thereby receive a compression force from, a relatively narrower portion of the tab retainers 270. Once fully inserted in the tab retainers, the tab members 282 resiliently return to their unflexed configuration, and the shape of the retainers 270 securely holds the tabs 280 therein.

Figure 10:
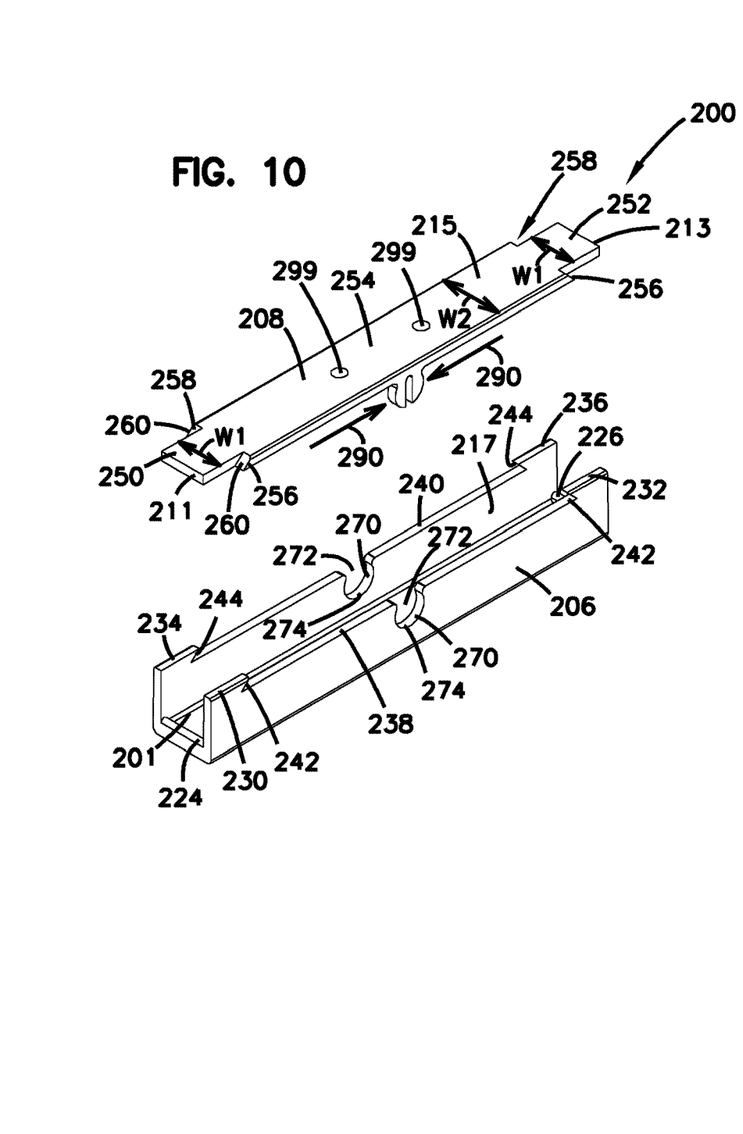
FIG. 10 is a perspective view of the housing of FIG. 6 in a disassembled configuration.
Figure 11:
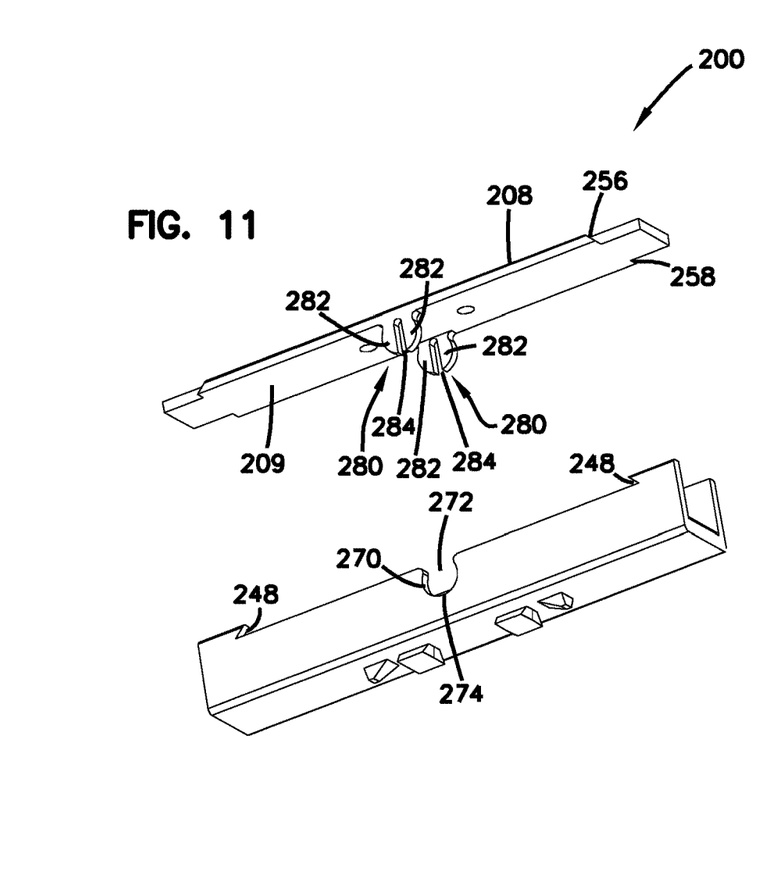
FIG. 11 is a further perspective view of the housing of FIG. 6 in a disassembled configuration.
Figure 12:
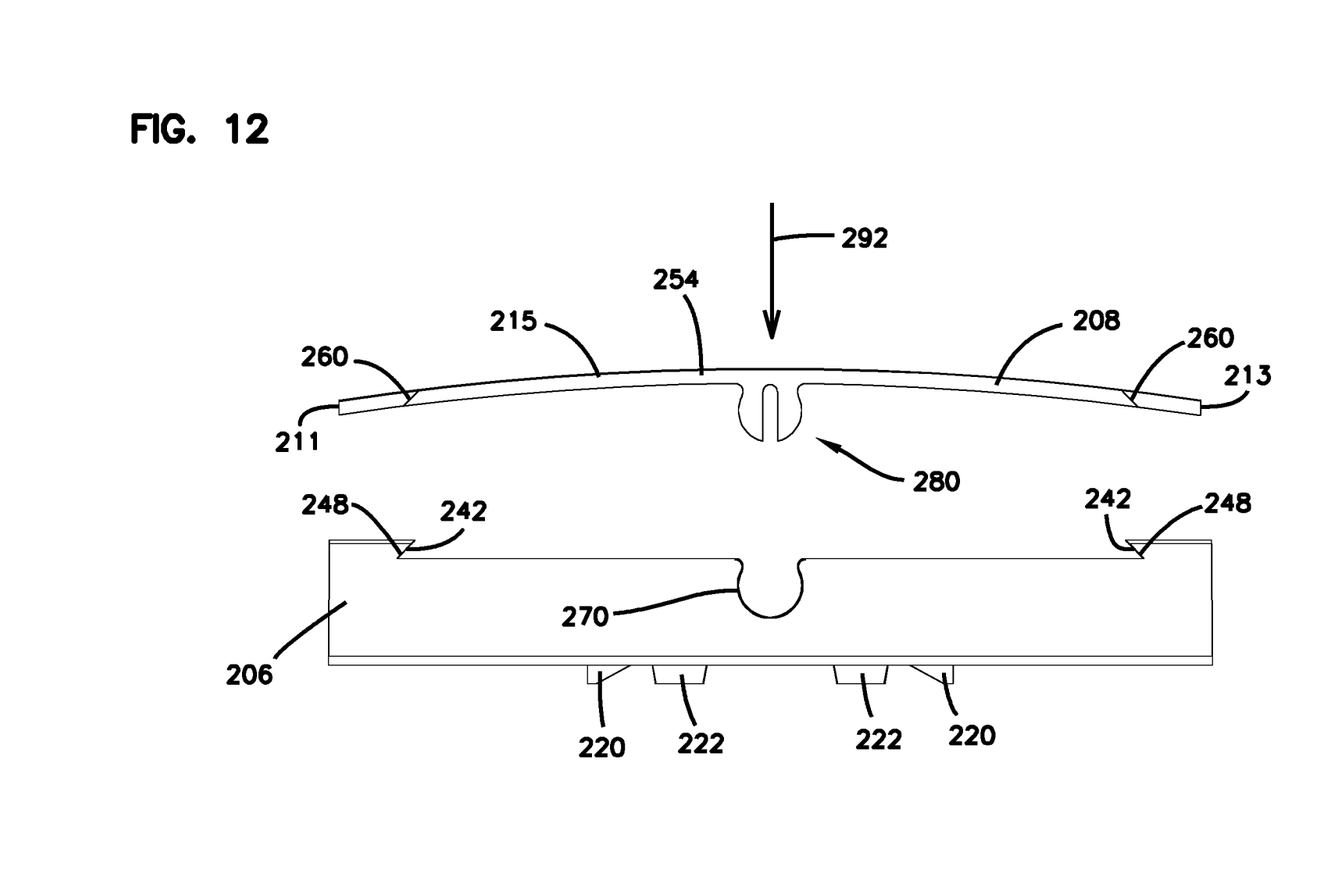
FIG. 12 is a further schematic view of the housing of FIG. 6 in a disassembled configuration and with the cover in a flexed configuration.

Referring now to FIG. 12, to assemble the housing 200 once one or more splitters (or other cable management components) have been inserted into and secured within the housing volume 201 defined by the body 206, force, e.g., a generally longitudinal squeezing force applied by a technician and/or a tool to the opposing ends 211 and 213 of the cover 208, causes the cover 208 to flex such that the middle section 254 is bowed upwards relative to the ends 211, 213 and such that the opposing longitudinal ends 211 and 213 of the cover 208 are closer together than in the unflexed configuration shown in, e.g., FIG. 10. Once the cover 208 is in the flexed configuration depicted in FIG. 12, the teeth 256, 258 (FIG. 10) can then be initially engaged with the notches 242, 244 such that a portions of the surfaces 248 abut portions of the surfaces 260. Once the teeth and notches are initially engaged, a downward force (along the direction of the arrow 292 in FIG. 12) can be applied to the top surface 215 of the cover 208 at an at least approximately longitudinally central position of the cover 208, causing the tabs 280 to enter the tab retainers 270 and become retained in the tab retainers 270 as described above. Once the tabs 280 are retained in the tab retainers, the teeth 256, 258 are fully and securely interlocked with the notches 242, 244, and the splitter housing 200 is fully and securely assembled without the need to couple the body 206 and cover 208 together with adhesive.

Optionally, one or more voids, such as through holes 299 (FIG. 10) can be provided in the cover 208. In some examples, the one or more voids 299 facilitate flexing of the cover 208 into the flexed configuration shown in FIG. 12. In some examples, the one or more voids 299 can be used as injection holes, e.g., for injecting adhesive into the housing volume 201 once the housing 200 has already been assembled.

Although in the foregoing description, terms such as "top" and "bottom," "up" and "down," and "higher and lower" were used for ease of description and illustration in relating features to one another. No restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An assembly for a cable management component housing, comprising:
    a body extending longitudinally from an open first end to an opposing open second end and including inner surfaces that define a cable management component housing volume between the open first and second ends, the body including a bottom wall, two parallel side walls extending from the bottom wall, and an open top extending between the two side walls between the first and second opposing ends, the bottom wall having an outer surface including a mounting feature protruding downward from the outer surface and away from the cable management component housing volume for mounting the body to a tray or a panel of a telecommunications closure, the two side walls defining a first set of locking features; and
    a cover, the cover defining a second set of locking features that are complementary to the first set of locking features and adapted to engage and interlock with the first set of locking features to cover the open top of the body.

2. The assembly of claim 1, wherein the cover has an unflexed configuration and a flexed configuration and is adapted to resiliently flex to the flexed configuration to engage the second set of locking features with the first set of locking features.

3. The assembly of claim 2, wherein the cover is adapted to return to an unflexed position to securely interlock the second set of locking features with the first set of locking features.

4. The assembly of claim 1, wherein each of the side walls includes opposing first longitudinal end sections and a first middle section positioned between the first longitudinal end sections, the first middle section being shorter than the first longitudinal end sections, and wherein transitions between the first longitudinal end sections and the first middle section of each wall define the first set of locking features.

5. The assembly of claim 1, wherein the first set of locking features includes two pairs of opposing notches or a pair of tab retainers.

6. The assembly of claim 5, wherein the second set of locking features includes two pairs of opposing teeth adapted to interlock with the two pairs of opposing notches, or a pair of tabs adapted to interlock with the pair of tab retainers.

7. The assembly of claim 5, wherein the first set of locking features includes the two pairs of opposing notches and each of the notches includes a surface that is angled acutely relative to a longitudinal axis of the body.

8. The assembly of claim 7, wherein the cover includes opposing second longitudinal end sections and a second middle section positioned between the second longitudinal end sections, wherein transitions between the second longitudinal end sections and the second middle section define the second set of locking features.

9. The assembly of claim 8, wherein the second set of locking features includes two pairs of opposing teeth, the teeth having a structure that complements the notches.

10. The assembly of claim 9, wherein each of the teeth includes a surface that is angled acutely relative to a longitudinal axis of the cover.

11. The assembly of claim 8, wherein the second longitudinal end sections have a width perpendicular to the longitudinal axis that is smaller than a corresponding width of the second middle section.

12. The assembly of claim 8, wherein first middle sections of the side walls define a third set of locking features.

13. The assembly of claim 12, wherein the second middle section of the cover includes a fourth set of locking features.

14. The assembly of claim 13, wherein the third and fourth sets of locking features are complementary and adapted to securely interlock with each other.

15. The assembly of claim 14, wherein the third set of locking features comprises a pair of tab retainers having a substantially round perimeter.

16. The assembly of claim 15, wherein the fourth set of locking features comprises a pair of tabs, each of the tabs comprising a pair of tab members defining a slot therebetween, each of the tab members having a partially round perimeter.

17. The assembly of claim 16, wherein the tab members are adapted to resiliently flex towards each other into the slot.

18. The assembly of claim 1, wherein the cover and the base are adapted to be permanently or semi-permanently interlockingly secured to each other without adhesive.

19. The assembly of claim 1, wherein the housing is adapted to house one or more fiber optic splitters.

20. The assembly of claim 1, wherein the housing is adapted to house one or more wave division multiplexors.

21. An assembly for a cable management component housing, comprising:
a body extending longitudinally from an open first end to an opposing open second end and including inner surfaces that define a cable management component housing volume between the open first and second ends, the body including a bottom wall, two parallel side walls extending from the bottom wall, and an open top extending between the two side walls between the first and second opposing ends, the bottom wall having an outer surface including a mounting feature for mounting the body to a tray or a panel of a telecommunications closure, the two side walls defining a first set of locking features; and
a cover, the cover defining a second set of locking features that are complementary to the first set of locking features and adapted to engage and interlock with the first set of locking features to cover the open top of the body,
wherein the first set of locking features includes two pairs of opposing notches and each of the notches includes a surface that is angled acutely relative to a longitudinal axis of the body.

22. The assembly of claim 21, wherein the cover includes opposing second longitudinal end sections and a second middle section positioned between the second longitudinal end sections, wherein transitions between the second longitudinal end sections and the second middle section define the second set of locking features.

23. The assembly of claim 22, wherein the second set of locking features includes two pairs of opposing teeth, the teeth having a structure that complements the notches.

24. The assembly of claim 23, wherein each of the teeth includes a surface that is angled acutely relative to a longitudinal axis of the cover.

25. The assembly of claim 22,
wherein the second longitudinal end sections have a width perpendicular to the longitudinal axis that is smaller than a corresponding width of the second middle section;
wherein first middle sections of the side walls define a third set of locking features; and
wherein the second middle section of the cover includes a fourth set of locking features.

26. The assembly of claim 25, wherein the third and fourth sets of locking features are complementary and adapted to securely interlock with each other.

27. The assembly of claim 26,
wherein the third set of locking features comprises a pair of tab retainers having a substantially round perimeter;
wherein the fourth set of locking features comprises a pair of tabs, each of the tabs comprising a pair of tab members defining a slot therebetween, each of the tab members having a partially round perimeter; and
wherein the tab members are adapted to resiliently flex towards each other into the slot.

* * * * *